(12) United States Patent
Maurer et al.

(10) Patent No.: US 8,672,795 B1
(45) Date of Patent: Mar. 18, 2014

(54) MULTISTAGE TRANSMISSION

(71) Applicant: ZF Friedrichshafen AG, Friedrichshafen (DE)

(72) Inventors: Markus Maurer, Lindau (DE); Torsten Buechner, Friedrichshafen (DE); Dominik Steinhauser, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/024,950

(22) Filed: Sep. 12, 2013

(30) Foreign Application Priority Data

Sep. 13, 2012 (DE) .......................... 10 2012 216 223

(51) Int. Cl.
*F16H 3/62* (2006.01)

(52) U.S. Cl.
USPC .......................................................... 475/279

(58) Field of Classification Search
USPC ...................................... 475/5, 279, 286, 290
See application file for complete search history.

(56) References Cited

U.S. PATENT DOCUMENTS

| | | | |
|---|---|---|---|
| 1,404,675 A | 1/1922 | Wilson | |
| 4,070,927 A | 1/1978 | Polak | |
| 5,593,357 A | 1/1997 | Justice et al. | |
| 6,962,549 B2 | 11/2005 | Dreibholz et al. | |
| 7,014,589 B2 | 3/2006 | Stevenson | |
| 7,785,226 B2 * | 8/2010 | Phillips et al. | 475/279 |
| 8,113,983 B2 | 2/2012 | Gumpoltsberger | |
| 8,398,522 B2 | 3/2013 | Bauknecht et al. | |
| 8,556,768 B2 * | 10/2013 | Park et al. | 475/286 |
| 8,602,934 B2 * | 12/2013 | Mellet et al. | 475/5 |
| 2010/0069191 A1 * | 3/2010 | Swales et al. | 475/5 |

FOREIGN PATENT DOCUMENTS

| | | |
|---|---|---|
| DE | 378413 | 7/1923 |
| DE | 27 21 719 A1 | 12/1977 |
| DE | 42 34 572 A1 | 4/1994 |
| DE | 102 44 023 A1 | 4/2004 |

(Continued)

OTHER PUBLICATIONS

German Search Report corresponding to DE 10 2012 216 223.2 dated May 13, 2013.

(Continued)

*Primary Examiner* — Edwin A Young
(74) *Attorney, Agent, or Firm* — Davis & Bujold, PLLC; Michael J. Bujold

(57) ABSTRACT

A multistage transmission in planetary design is proposed, comprising a basic transmission (8) and a group transmission (9) downstream of the basic transmission (8), wherein the basic transmission (8) comprises three planetary gear set (P1, P2, P3), at least six rotatable shafts (1, 2, 3, 4, 5, 6) and at least five shift elements (A, B, D, E, F), the selected engagement of which results in different transmission ratios between the input drive and the output drive, wherein the group transmission (9) has a minus planetary gear set (P4), the sun gear of which is connected to the output shaft (2) of the basic transmission (8), the ring gear of which can be coupled to the housing (G) via a first shift element (K1), and the carrier of which is connected to the output shaft (7) of the multistage transmission, which can be releasably connected to the ring gear via a second shift element (K2), and wherein the basic transmission (8) and the group transmission (9) are disposed in a common housing (G).

15 Claims, 14 Drawing Sheets

(56) References Cited

FOREIGN PATENT DOCUMENTS

| | | |
|---|---|---|
| DE | 10 2004 029 952 A1 | 1/2005 |
| DE | 10 2007 022 776 A1 | 12/2008 |
| DE | 10 2008 000 429 A1 | 9/2009 |
| DE | 10 2010 039 862 A1 | 3/2012 |
| EP | 0 965 773 A1 | 12/1999 |
| JP | H07 54941 A | 2/1995 |
| JP | H08 74952 A | 3/1996 |
| JP | 2006 046390 A | 2/2006 |
| JP | 2010 203 542 A | 9/2010 |

OTHER PUBLICATIONS

German Search Report corresponding to DE 10 2012 216 226.7 dated May 13, 2013.

German Search Report corresponding to DE 10 2012 216 225.9 dated May 13, 2013.

\* cited by examiner

| GEAR/SE | TRANSMISSION RATIO | CLAW A | FRIC-TION B | FRIC-TION D | FRIC-TION E | CLAW F | CLAW K1 | FRIC-TION K2 | GEAR CHANGE | GEAR INCREMENT | SHIFT TYPE |
|---|---|---|---|---|---|---|---|---|---|---|---|
| 1 | 9.08 | X |  |  |  | X | X |  |  |  |  |
| 2 | 5.15 | X |  | X | X |  |  |  | 1->2 | 1.76 | SHIFT UNDER LOAD |
| 3 | 3.84 | X | X |  |  |  | X |  | 2->3 | 1.34 | SHIFT UNDER LOAD |
| 4 | 2.70 | X |  | X | X |  |  |  | 3->4 | 1.42 | SHIFT UNDER LOAD |
| 5 | 1.91 | X |  |  |  |  | X |  | 4->5 | 1.41 | SHIFT UNDER LOAD |
| 6 | 1.42 | X | X | X |  |  |  | X | 5->6 | 1.34 | SHIFT UNDER LOAD |
| 7 | 1.00 |  | X |  |  |  |  | X | 6->7 | 1.42 | SHIFT UNDER LOAD |
| 8 | 0.72 |  | X | X |  |  |  | X | 7->8 | 1.39 | SHIFT UNDER LOAD |
| 9 | 0.62 |  | X |  | X |  |  | X | 8->9 | 1.17 | SHIFT UNDER LOAD |
| OVERALL GEAR RATIO SPREAD: | 14.77 | | | | | | | | | | |
| TRANSMISSION RATIO GROUP: | 2.7 | | | | | | | | | | |

Fig. 2

| GEAR/SE | TRANSMISSION RATIO | FRICTION A | FRICTION B | FRICTION D | FRICTION E | CLAW F | CLAW K1 | FRICTION K2 | GEAR CHANGE | GEAR INCREMENT | SHIFT TYPE |
|---|---|---|---|---|---|---|---|---|---|---|---|
| 1 | 6.39 | X | | | | X | X | | | | |
| 2 | 3.63 | X | | | X | | X | | 1->2 | 1.76 | SHIFT UNDER LOAD |
| 3 | 2.70 | X | X | X | | | | | 2->3 | 1.34 | SHIFT UNDER LOAD |
| 4 | 1.90 | X | X | | | | X | | 3->4 | 1.42 | SHIFT UNDER LOAD |
| 5 | 1.37 | X | X | X | | | X | | 4->5 | 1.39 | SHIFT UNDER LOAD |
| 6 | 1.00 | | X | | | | | X | 5->6 | 1.37 | SHIFT UNDER LOAD |
| 7 | 0.72 | | X | X | | | | X | 6->7 | 1.39 | SHIFT UNDER LOAD |
| 8 | 0.62 | | | | X | | | X | 7->8 | 1.17 | SHIFT UNDER LOAD |
| OVERALL GEAR RATIO SPREAD: | 10.39 | | | | | | | | | | |
| TRANSMISSION RATIO GROUP: | 1.9 | | | | | | | | | | |

Fig. 3

| GEAR/SE | TRANSMISSION RATIO | CLAW A | FRIC-TION B | FRIC-TION D | FRIC-TION E | CLAW F | CLAW K1 | CLAW K2 | GEAR CHANGE | GEAR INCREMENT | SHIFT TYPE |
|---|---|---|---|---|---|---|---|---|---|---|---|
| 1 | 9.08 | X | | | | X | X | | | | |
| 2 | 5.15 | X | | X | X | | X | | 1->2 | 1.76 | SHIFT UNDER LOAD |
| 3 | 3.84 | X | X | | | | X | | 2->3 | 1.34 | SHIFT UNDER LOAD |
| 4 | 2.70 | X | | X | | | X | | 3->4 | 1.42 | SHIFT UNDER LOAD |
| 5 | 1.91 | X | | | X | | | | 4->5 | 1.41 | ✱ |
| 6 | 1.42 | X | X | X | | | | X | 5->6 | 1.34 | SHIFT UNDER LOAD |
| 7 | 1.00 | | X | | | | | X | 6->7 | 1.42 | SHIFT UNDER LOAD |
| 8 | 0.72 | | X | X | | | | X | 7->8 | 1.39 | SHIFT UNDER LOAD |
| 9 | 0.62 | | X | | X | | | X | 8->9 | 1.17 | SHIFT UNDER LOAD |
| OVERALL GEAR RATIO SPREAD: | 14.77 | | | | | | | | | | |
| TRANSMISSION RATIO GROUP: | 2.7 | | | | | | | | | | |

✱ GROUP SHIFT WITH INTERRUPTION OF TRACTIVE FORCE OF APPROX. 0.5S

Fig. 5

| GEAR/SE | TRANSMISSION RATIO | FRIC-TION A | FRIC-TION B | FRIC-TION D | FRIC-TION E | CLAW F | CLAW K1 | CLAW K2 | GEAR CHANGE | GEAR INCREMENT | SHIFT TYPE |
|---|---|---|---|---|---|---|---|---|---|---|---|
| 1 | 6.39 | X | | | | X | X | | | | |
| 2 | 3.63 | X | | X | X | | | | 1->2 | 1.76 | SHIFT UNDER LOAD |
| 3 | 2.70 | X | | X | | | X | | 2->3 | 1.34 | SHIFT UNDER LOAD |
| 4 | 1.90 | X | X | X | | | X | | 3->4 | 1.42 | SHIFT UNDER LOAD |
| 5 | 1.37 | | X | | | | X | | 4->5 | 1.39 | SHIFT UNDER LOAD |
| 6 | 1.00 | X | X | | | | | X | 5->6 | 1.37 | * |
| 7 | 0.72 | | X | X | | | | X | 6->7 | 1.39 | SHIFT UNDER LOAD |
| 8 | 0.62 | | X | | X | | | X | 7->8 | 1.17 | SHIFT UNDER LOAD |
| OVERALL GEAR RATIO SPREAD: | 10.39 | | | | | | | | | | |
| TRANSMISSION RATIO GROUP: | 1.9 | | | | | | | | | | |

* GROUP SHIFT WITH INTERRUPTION OF TRACTIVE FORCE OF APPROX. 0.5S

Fig. 6

MULTISTAGE TRANSMISSION

This application claims priority from German Application Serial No. 10 2012 216 223.2 filed on Sep. 13, 2012.

FIELD OF THE INVENTION

The present invention relates to a multistage transmission of planetary design, in particular an automatic transmission for a motor.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

Automatically shiftable vehicle transmissions of planetary design, are already generally described numerous times in the prior art and are continually undergoing further development and improvement. These transmissions should have a relatively simple design, in particular requiring a low number of shift elements, and minimize the need for double shifting when sequential shifting is performed, that is, avoiding engaging or disengaging two shift elements, thereby ensuring that only one shift element is ever switched when shifting is performed in defined groups of gears.

The document DE 2721719 A1 describes a multistage transmission in planetary design having six forward gears and one reverse gear comprising three minus planetary gear sets, called the first, second and third planetary gear set in the following, disposed in a housing, six rotatable shafts, called drive shaft, output shaft, third, fourth, fifth and sixth shafts in the following, and five shift elements. Here, the sun gear of the first planetary gear set is connected to the drive shaft which, via a first clutch, can be releasably connected to the sixth shaft connected to the sun gear of the second planetary gear set and to the sun gear of the third planetary gear set, and via a second clutch, can be releasably connected to the fifth shaft, connected to the carrier of the second planetary gear connected to the fifth shaft, connected to the carrier of the second planetary gear set and the ring gear of the third planetary gear set, and which can be coupled via a third brake to the housing. With the known transmission it is also provided that the carrier of the first planetary gear set is connected to the fourth shaft, which is connected to the ring gear of the second planetary gear set and can be coupled via a second brake to the housing, and that the ring gear of the first planetary gear set is connected to the third shaft, which can be coupled via a first brake to the housing, wherein the output shaft is connected to the carrier of the third planetary gear set. The brakes and clutches of the transmission are implemented as friction engaged shift elements, particularly as multi-disk shift elements.

Because two engaged shift elements are required for each gear with the transmission according to the document DE 2721719 A1, with each gear three friction engaged shift elements are disengaged which disadvantageously results in undesired drag torques that negatively influence the efficiency of the transmission.

Further, it is provided that the first clutch is engaged for the first four forward gears, wherein the third brake is required only for implementing the first forward gear and is shifted into the power flow. This means that the first clutch and the third brake, because they are required for the first forward gear, are designed such that they support the entire engine torque including the maximum conversion. For the further gears of the transmission, a substantially smaller design of the shift elements would be sufficient.

Engaging a gear in the first forward gear, the coasting and tractive downshift from second gear into the first forward gear, and the coasting and tractive downshift from fifth gear in to the fourth forward gear, are qualitatively negatively influenced due to the maximum design of the first clutch and the third brake. In order to optimize the shift quality with these shifts, the number of disks of the first clutch and the third brake is reduced according to the prior art, which however disadvantageously results in reduced transfer capability of these shift elements in the first forward gear.

From the prior art, for example from the documents DE 10 2008 000 429 A1 and DE 10 2007 022 776 A1 from the applicant, transmissions in planetary design are known in which a portion of the shift elements are implemented as form-locking shift elements.

Due to the design of a portion of the shift elements of a transmission as form-locking shift elements, the power loss due to the drag torque of disengaged shift elements is reduced, and the transfer capability is increased with respect to the shift elements, wherein the mechanical overall gear ratio spread remains the same.

The mechanical overall gear ratio spread of a transmission is a key control variable in order to operate the upstream internal combustion engine at an optimal operating point, whereby the fuel consumption can be reduced. Further, the mechanical overall gear ratio spread of a transmission is an important parameter in order to attain specific driving performance in special applications.

Further developments of existing transmissions known from the prior art, implemented to be shiftable under load, result in a slight increase of the overall gear ratio spread and are disadvantageously complex and expensive.

Further, from the prior art it is known to combine automatic transmissions with additional automatically shiftable distributor transmissions for representing a group shift, which are integrated in the drive strategy, thereby increasing the mechanical overall gear ratio spread.

However, this design has the disadvantage that a two-stage distributor transmission is necessary for representing a group shift, which results in high manufacturing and assembly costs and large construction space needs. The distributor transmission, as a rule, is implemented as a transmission in countershaft design. Additionally, the distributor transmission, with respect to the attainable transmission ratio, the design of the form-locking shift elements and the synchronization measures, must be adapted to the upstream transmission and the internal combustion engine. In addition, the group shifts disadvantageously cannot be shifted under load.

SUMMARY OF THE INVENTION

Starting from a transmission according to DE 2721719 A1, the problem addressed by the present invention is to propose a multistage transmission with which a high mechanical overall gear ratio spread is implemented in a simple constructive manner and with small construction space requirements.

Additionally, in the scope of a further development of the invention, the power loss due to the drag torque of disengaged shift elements is to be reduced and the transfer capability is to be increased, with optimized shift quality with respect to the shift elements.

Accordingly, a multistage transmission according to the invention is proposed in planetary design, comprising a basic transmission and, downstream to the basic transmission, a group transmission, wherein the basic transmission and the group transmission are disposed in a common housing, wherein the basic transmission comprises an input drive and an output drive, which are disposed in a housing, three planetary gear sets, designated in the following as the first, second and third planetary gear sets, at least six rotatable shafts, designated in the following as drive shaft, output shaft, third, fourth, fifth and sixth shafts, and at least five shift elements, the selective engagement of which causes different transmission ratios between the input drive and the output drive, wherein the group transmission has a minus planetary gear set, the sun gear of which is connected to the output shaft of the basic transmission, the ring gear of which can be coupled to the housing of the multistage transmission via a first shift element preferably designed as a form-locking shift element, and the carrier of which is connected to the output shaft of the multistage transmission, which can be releasably connected to the ring gear via a second shift element.

The planetary gear sets of the basic transmission are preferably implemented as minus planetary gear sets.

As is well known, a simple minus planetary gear set comprises a sun gear, a ring gear, and a carrier on which the planetary gears are rotatably supported, the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear and a carrier, on which inner and outer planet gears are rotatably supported, wherein all inner planet gears mesh with the sun gear and all outer planet gears mesh with the ring gear, and each inner planet gear meshes with only one outer planet gear. As a result, when the carrier is fixed, the ring gear has the same direction of rotation as the sun gear, and results in a positive stationary transmission ratio.

With the basic transmission, the sun gear of the first planetary gear set is connected to the drive shaft which, via a first clutch, can be releasably connected to the sixth shaft connected to the sun gear of the second planetary gear set and the sun gear of the third planetary gear set, and via a second clutch, can be releasably connected to the fifth shaft, connected to the carrier of the second planetary gear set and the ring gear of the third planetary gear set, and which can be coupled via a third brake to the housing. Additionally, the carrier of the first planetary gear set is connected to the fourth shaft, which is connected to the ring gear of the second planetary gear set and can be coupled to the housing via a second brake, wherein the ring gear of the first planetary gear set is connected to the third shaft, which can be coupled to the housing via a first brake, and wherein the output shaft is connected to the carrier of the third planetary gear set.

Here, the third brake is preferably implemented as a form-locking shift element (claw shift element), wherein the second clutch and the first and second brakes are implemented as multi-disk shift elements. The first clutch can be implemented as a form-locking shift element or as a multi-disk shift element.

In the scope of a particularly advantageous embodiment of the invention, the second shift element of the group transmission, which releasably connects the output shaft of the multistage transmission to the ring gear of the planetary gear set of the group transmission, is implemented as a multi-disk shift element, whereby shifting under load is guaranteed. In total, the multistage transmission has nine forward gears that are shiftable under load.

According to a further embodiment of the invention, the second shift element of the group transmission, which releasably connects the output shaft of the multistage transmission to the ring gear of the planetary gear set of the group transmission, is implemented as a form-locking shift element. This results in the advantage that costs are reduced, because one multi-disk shift element is eliminated. Shifts within the group transmission cannot be shifted under load however, that is, there is an interruption of tractive force with the group change.

Using the design according to the invention, starting from the basic transmission, the mechanical overall gear ratio spread and the number of gears are increased by simple, inexpensive design measures. Additionally, less additional construction space is required because the basic transmission is expanded by a simple minus planetary gear set which is integrated into the multistage transmission.

According to the invention, the first clutch and/or the third brake of the basic transmission can be implemented as form-locking shift elements, whereby the power loss due to the drag torque can be reduced.

BRIEF DESCRIPTION OF THE DRAWINGS

The invention is described in greater detail in the following, as an example, with reference to the attached figures. They show:

FIG. 2: an example of a shift pattern for the forward gears of the multistage transmission according to FIG. 1;

FIG. 3: a further example of a shift pattern for the forward gears of a multistage transmission according to FIG. 1, wherein the first clutch of the basic transmission is implemented as a multi-disk shift element.

FIG. 5: an example of a shift pattern for the forward gears of the multistage transmission according to FIG. 4; and FIG. 6: a further example of a shift pattern for the forward gears of a multistage transmission according to FIG. 4, wherein the first clutch of the basic transmission is implemented as a multi-disk shift element.

DETAILED DESCRIPTION OF THE DRAWINGS

Figure 1:
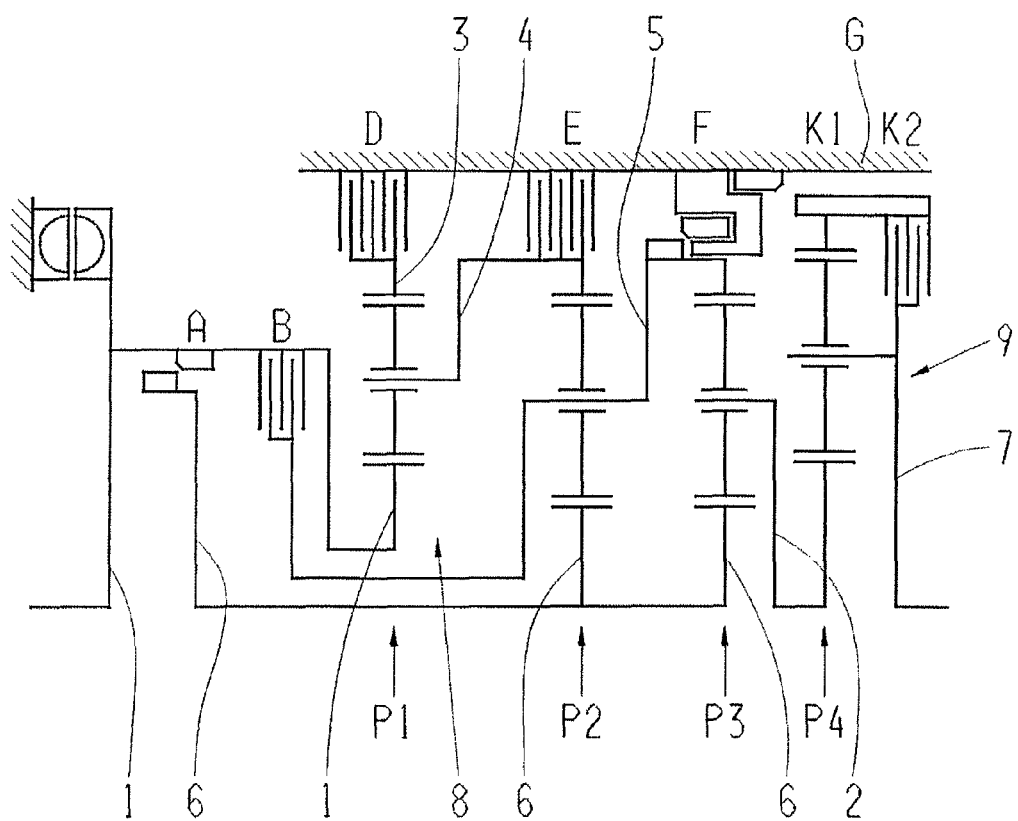
FIG. 1: a schematic view of a preferred embodiment of a multistage transmission according to the invention, comprising a group transmission shiftable under load.
Figure 1A:
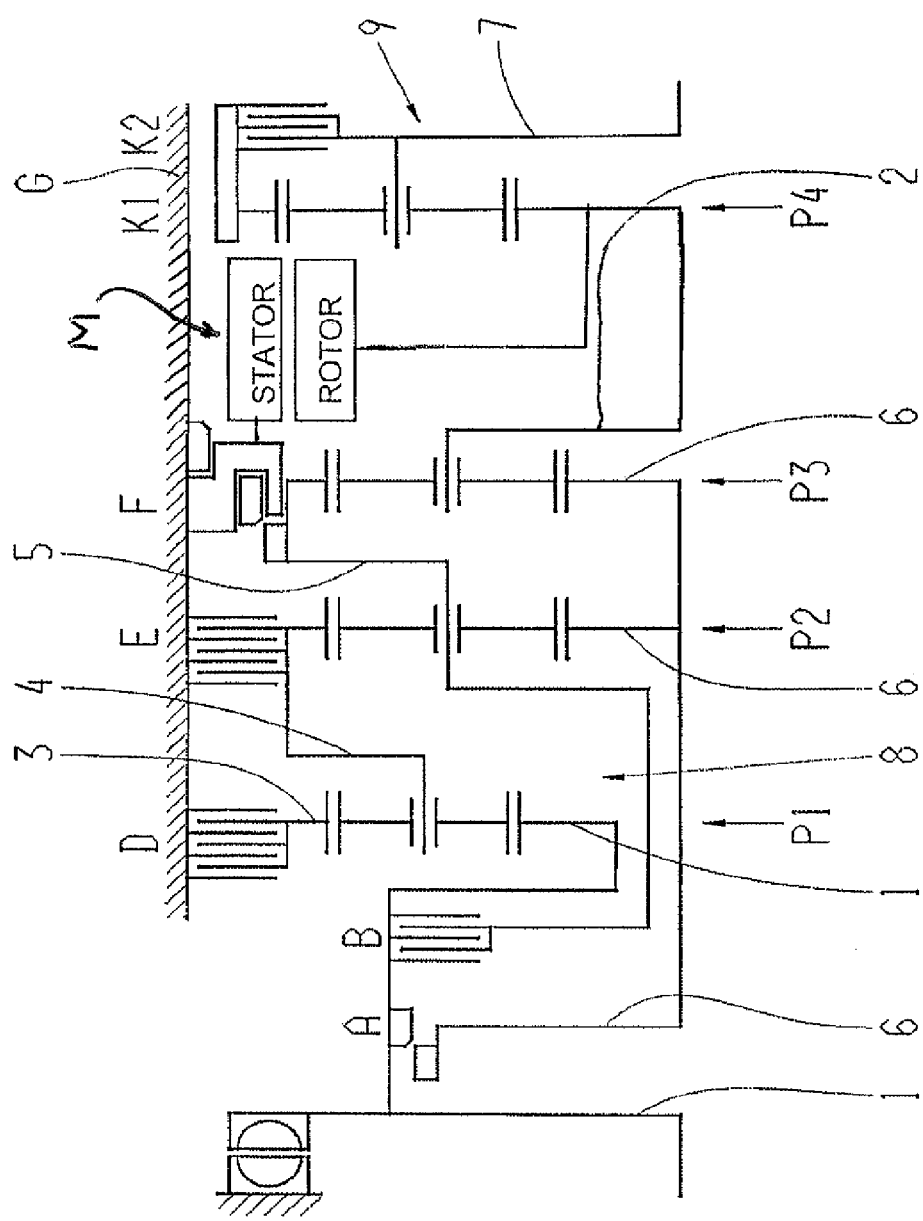
FIG. 1A: a schematic view of another embodiment of a multistage transmission, according to the invention, with an electric machine connected thereto.
Figure 1B:
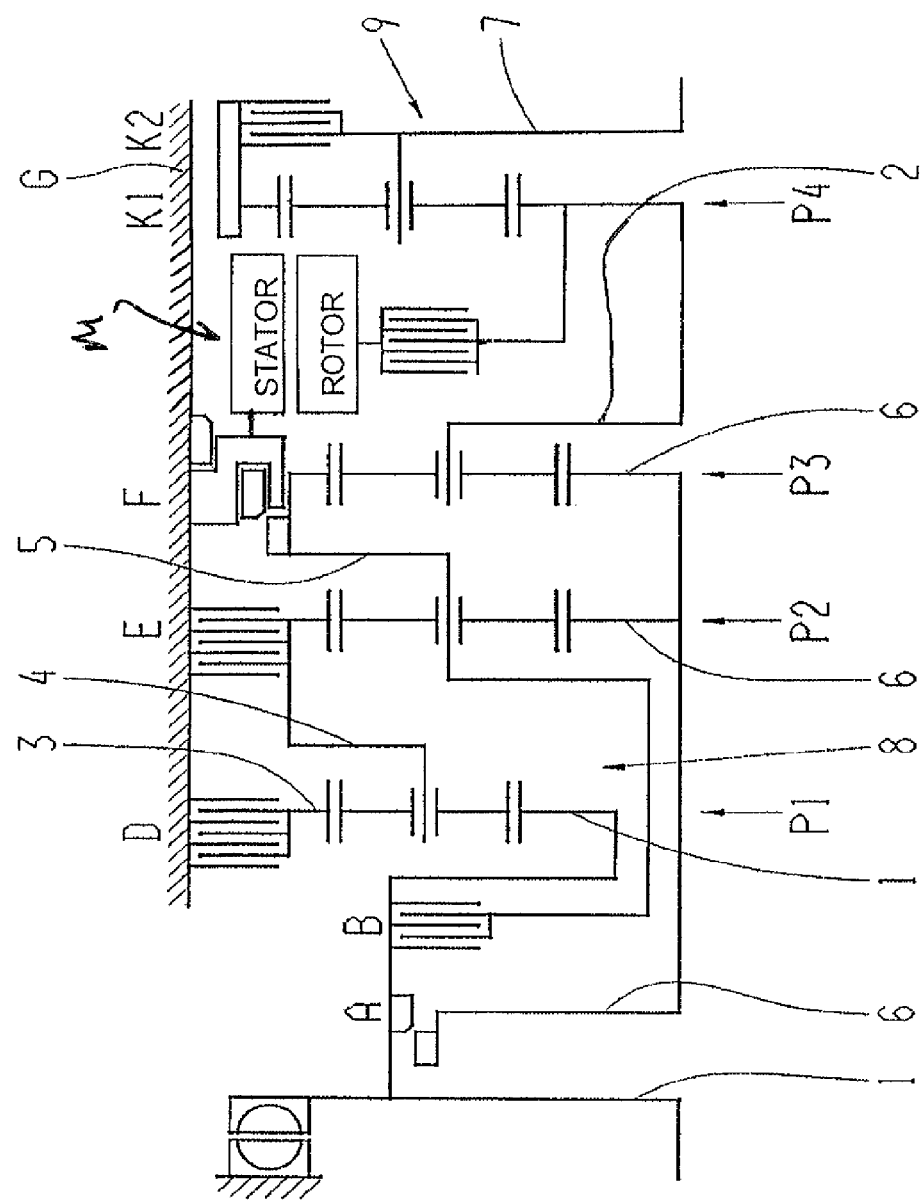
FIG. 1B: a schematic view of the another embodiment of a multistage transmission, according to the invention, with an electric machine connected thereto via a clutch.
Figure 1C:
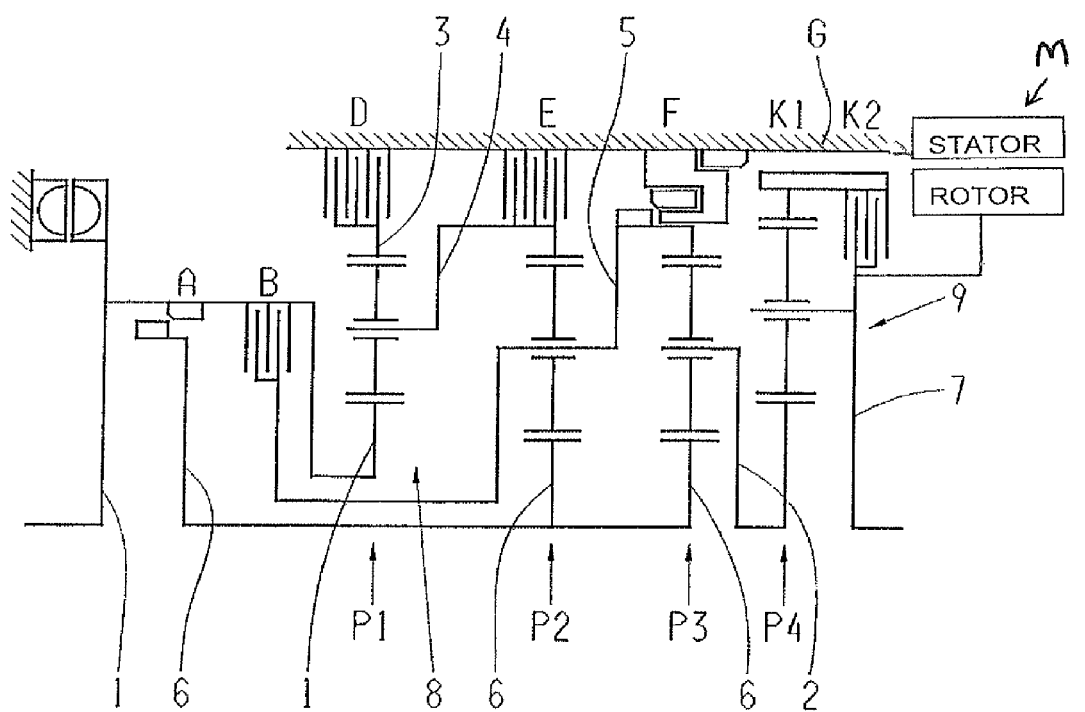
FIG. 1C: a schematic view of a further embodiment of a multistage transmission, according to the invention, with an electric machine connected thereto.
Figure 1D:
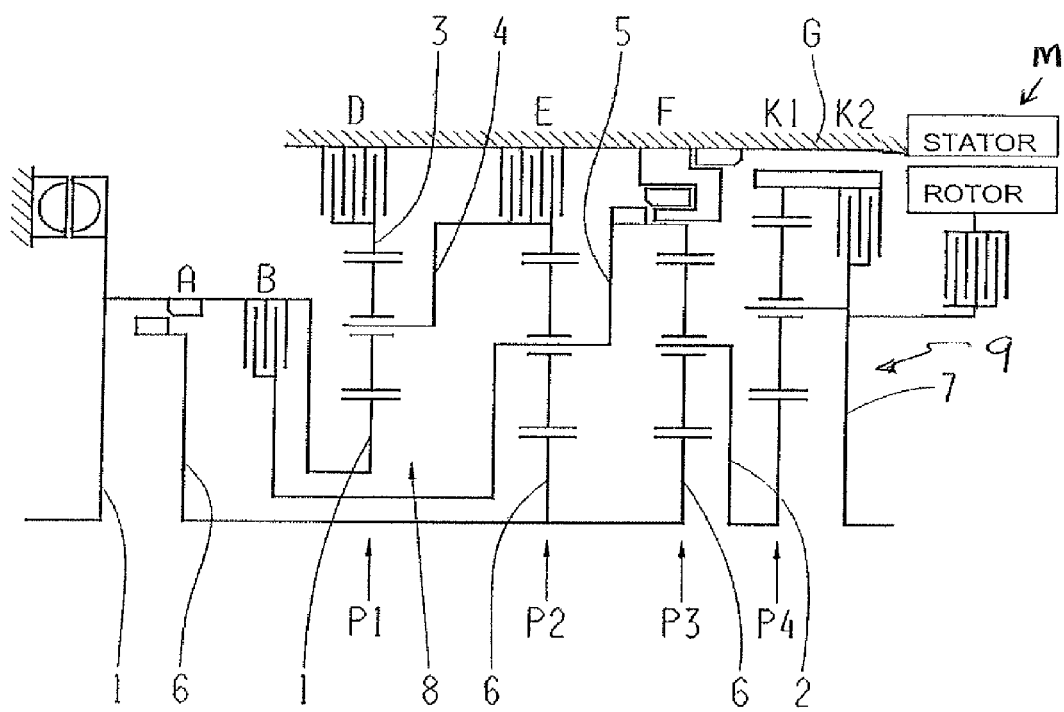
FIG. 1D: a schematic view of the further embodiment of a multistage transmission, according to the invention, with an electric machine connected thereto via a clutch.

FIG. 1 shows a multistage transmission according to the invention, comprising a basic transmission 8 and a group transmission 9 that is downstream of the basic transmission 8. The basic transmission 8 comprises a drive shaft 1, an output shaft 2 and three planetary gear sets P1, P2 and P3, which are disposed in a housing G. The planetary gear sets P1, P2 and P3, in the example shown in FIG. 1, are designed as minus planetary gear sets. Here, at least one of the planetary gear sets P1, P2, P3 can be implemented as a plus planetary gear set if the carrier and ring gear connection are exchanged and, simultaneously, the value of the stationary transmission ratio is increased by 1 in comparison to the embodiment as a minus planetary gear set.

With the example embodiment shown, viewed in the axial direction, the planetary gear sets P1, P2, P3 are disposed in a series of the first planetary gear set P1, second planetary gear set P2, third planetary gear set P3. The axial sequence of the individual planetary gear sets and the arrangement of the shift elements are freely selectable, as long as the connectability of the elements permits this.

As seen in FIG. 1, the basic transmission 8 has five shift elements, namely three brakes D, E, F and two clutches A, B. The spatial disposition of the shift elements can be arbitrary, and is limited only by the dimensions of the outer design. The basic transmission, according to the invention, has a total of six rotatable shafts, namely, the shafts 1, 2, 3, 4, 5 and 6, wherein the drive shaft forms the first shaft 1 and the output shaft forms the second shaft 2 of the basic transmission 8.

With the basic transmission 8, the sun gear of the first planetary gear set P1 is connected to the drive shaft 1, which, via a first clutch A, can be releasably connected to the sixth shaft 6, connected to the sun gear of the second planetary gear set P2, and to the sun gear of the third planetary gear set P3, and via a second clutch B, can be releasably connected to the fifth shaft 5, connected to the carrier of the second planetary gear set P2 and the ring gear of the third planetary gear set P3, wherein the fifth shaft 5 can be coupled via a third brake F to the housing G.

With reference to FIG. 1, the carrier of the first planetary gear set P1 is connected to the fourth shaft 4, which is connected to the ring gear of the second planetary gear set P2 and can be coupled to the housing G via a second brake E. Additionally, the ring gear of the first planetary gear set P1 is connected to the third shaft 3, which can be coupled to the housing G via a first brake D, wherein the output shaft 2 of the basic transmission 8 is connected to the carrier of the third planetary gear set P3.

With the example shown, the first clutch A and the third brake F are designed as claws shift elements, wherein the second clutch B and the first and second brakes D, E are designed as multi-disk shift elements. Alternatively, it is possible to implement first clutch A and/or the third brake F as multi-disk shift elements.

According to the invention the multistage transmission comprises a group transmission 9 which has a minus planetary gear set P4, designated in the following as a fourth planetary gear set. As seen in FIG. 1, the sun gear of the fourth planetary gear set P4 is connected to the output shaft 2 of the basic transmission 8, wherein the ring gear of the fourth planetary gear set P4 can be coupled to the housing G of the basic transmission 8 via a first shift element K1, which with the example shown is implemented as a form-locking shift element, and the carrier is connected to the output shaft 7 of the multistage transmission, which can be releasably connected to the ring gear via a second shift element K2 that is implemented as a multi-disk shift element for enabling the ability to shift under load. By engaging the second shift element K2, the fourth planetary gear set P4 is blocked because the ring gear is connected to the carrier. Due to the use of a planetary gear set as a group transmission, the housing G of the basic transmission 8 is only insignificantly elongated in an advantageous manner in order to serve as the housing of the multistage transmission.

It is particularly advantageous to implement the third brake F as a claw shift element, whereby the actuation thereof in the implementation as a multi-disk shift element can be used for actuating the second shift element K2 of the group transmission 9, which leads to a reduction of the costs and the necessary construction space. Thus, starting from a basic transmission 8, having a third brake F implemented as a multi-disk shift element, the third brake F is implemented as a claw shift element, wherein the actuation of the third brake F as a multi-disk shift element serves for the actuation of the second shift element K2 of the group transmission 9.

Additionally, it is possible to implement the first shift element K1 of the group transmission 9 as a claw shift element because this shift element according to the invention must only be disengaged with upshifts under load; the synchronization between the basic transmission 8 and the group transmission 9 is performed by the second brake E of the basic transmission 8 and the second shift element K2 of the group transmission 9, which are implemented as multi-disk shift elements, wherein in this case, two rotational speed sensors are required because the two shift elements slip simultaneously.

According to the invention, with downshifts under load the second brake E of the basic transmission 8 and the second shift element K2 of the group transmission 9, which are implemented as multi-disk shift elements, are disengaged in a controlled manner, wherein the synchronization rotational speed for the first shift element K1 of the group transmission 9 is attained, and then this shift element is engaged.

With coasting downshifts, the second brake E of the basic transmission 8 and the second shift element K2 of the group transmission 9 are disengaged and the second clutch B of the basic transmission 8 is engaged, wherein the synchronization speed for the first shift element K1 of the group transmission 9 is attained by means of a target engine speed.

Additionally, with coasting upshifts, the second clutch B of the basic transmission 8 and the first shift element K1 of the group transmission 9 are disengaged wherein the second brake 13 of the basic transmission 8 is engaged and upon attaining the synchronization speed, the second shift element K2 of the group transmission 9 is engaged.

If the hydraulic control of the basic transmission 8 is not to be changed, the third brake F of the basic transmission 8 implemented as a claw shift element and the first shift element K1 of the group transmission 9, implemented as a claw shift element, are controlled using an external actuation, for example pneumatically.

FIG. 2 shows an exemplary shift pattern for the forward gears of a multistage transmission according to FIG. 1, wherein nine forward gears can be implemented. Two shift elements of the basic transmission 8 and one shift element of the group transmission 9 are engaged for each gear. It can be seen in FIG. 2 that when shifting sequentially in the basic transmission, only one shift element must be engaged and one shift element must be disengaged in each case, because two adjacent gear steps jointly use two shift elements. Additionally, when shifting sequentially, only in the case of a gear change from the fourth into the fifth forward gear, or from the fifth into the fourth forward gear, a total of two shift elements are to be disengaged and two shift elements are to be engaged. It can be seen in the shift pattern that a mechanical overall gear ratio spread of 14.77 can be attained, wherein the transmission ratio attainable in the group transmission 9 is 2.7.

The first forward gear results from engaging the first clutch A and the third brake F of the basic transmission 8 and the first shift element K1 of the group transmission 9; a second forward gear results from engaging the first clutch A and the second brake E of the basic transmission 8 and the first shift element K1 of the group transmission 9; a third forward gear results from engaging the first clutch A and the first brake D of the basic transmission 8 and the first shift element K1 of the group transmission 9; a fourth forward gear results from engaging the first clutch A and the second clutch B of the basic transmission 8 and the first shift element K1 of the group transmission 9; a fifth forward gear results from engaging the first clutch A and the second brake E of the basic transmission 8 and the second shift element K2 of the group transmission 9; a sixth forward gear results from engaging the first clutch A and the first brake D of the basic transmission 8 and the second shift element K2 of the group transmission 9; the seventh forward gear, with the example shown designed as a direct gear, results from engaging the first clutch A and the second clutch B of the basic transmission 8 and a second shift element K2 of the group transmission 9; the eighth forward gear results from engaging the second clutch B and the first brake D of the basic transmission 8 and the second shift element K2 of the group transmission 9; and a ninth forward gear results from engaging the second clutch B and the second brake E of the basic transmission 8 and the second shift element K2 of the group transmission 9.

The gear changes 1-2, 2-3, 3-4, 4-5, 5-6, 6-7, 7-8, 8-9 and 9-8, 8-7, 7-6, 6-5, 5-4, 4-3, 3-2, 2-1 can be shifted under load.

As seen in the shift pattern, using the embodiment of the first clutch A and the third brake F of the basic transmission 8 as claw shift elements and using the embodiment of the first shift element K1 of the group transmission 9 as a claw shift element, the drag losses are minimized because in the lower gears at most three multi-disk shift elements are disengaged, wherein in the higher gears only one or two multi-disk shift elements are disengaged. Additionally the transfer capability with respect to the shift elements is increased in all gears, wherein for the case that the clutch A of the basic transmission 8 is implemented as a claw shift element, a theoretically unlimited transfer capability results in the first forward gear.

With the transmission according to FIG. 1, advantageously, no additional pressure regulator is necessary because the claw shift element can be actuated using magnet valves.

In the scope of a further development of the invention, with the multistage transmission according to FIG. 1, a torque converter can be eliminated due to the high mechanical overall gear ratio spread, wherein the construction space can be used for installing a crankshaft starter generator.

Because the first forward gear has a very high transmission ratio it is required only in extreme situations; the forward gears 2-9 correspond to the gears of a harmonically stepped 8 speed transmission.

The subject matter of FIG. 3 is a shift pattern for a multistage transmission according to FIG. 1 with the difference that the first clutch A of the basic transmission 8 is implemented as a multi-disk shift element. With the example shown, eight forward gears can be implemented, wherein the gear changes 1-2, 2-3, 3-4, 4-5, 5-6, 6-7, 7-8 and 8-7, 7-6, 6-5, 5-4, 4-3, 3-2, 2-1 can be shifted under load. The mechanical overall gear ratio spread in the example shown is 10.39, wherein the transmission ratio attainable in the group transmission 9 is 1.9.

The first forward gear results from engaging the first clutch A and the third brake F of the basic transmission 8 and the first shift element K1 of the group transmission 9; the second forward gear results from engaging the first clutch A and the second brake E of the basic transmission 8 and the first shift element K1 of the group transmission 9; a third forward gear results from engaging the first clutch A and the first brake D of the basic transmission 8 and the first shift element K1 of the group transmission 9; a fourth forward gear results from engaging the first clutch A and the second clutch B of the basic transmission 8 and the first shift element K1 of the group transmission 9; the fifth forward gear results from engaging the second clutch B and the first brake D of the basic transmission 8 and the first shift element K1 of the group transmission 9; a sixth forward gear designed with the example shown as a direct gear results from engaging the first clutch A and the second clutch B of the basic transmission 8 and the second shift element K2 of the group transmission 9; a seventh forward gear results from engaging the second clutch B and the first brake D of the basic transmission 8 and the second shift element K2 of the group transmission 9; and the eighth forward gear results from engaging the second clutch B and the second brake E of the basic transmission 8 and a second shift element K2 of the group transmission 9.

Because the first forward gear has a very high transmission ratio, it is required only in extreme situations; the forward gears 2-8 correspond to the gears of a harmonically stepped 7 speed transmission. A further advantage consists in that the group shift occurs only in higher speed ranges.

In the scope of a further embodiment, the group shift can be suppressed, wherein the multistage transmission is operated in one group stage as a six speed transmission. Here, a inclination sensor can be provided by means of which the operating mode of the group transmission is controlled.

Additionally, the group transmission can be implemented as a transmission in countershaft design; in addition, the multi-disk shift elements can be implemented as lockable friction clutches, wherein after completing synchronization, a claw is engaged and the shift element is locked.

Figure 4:
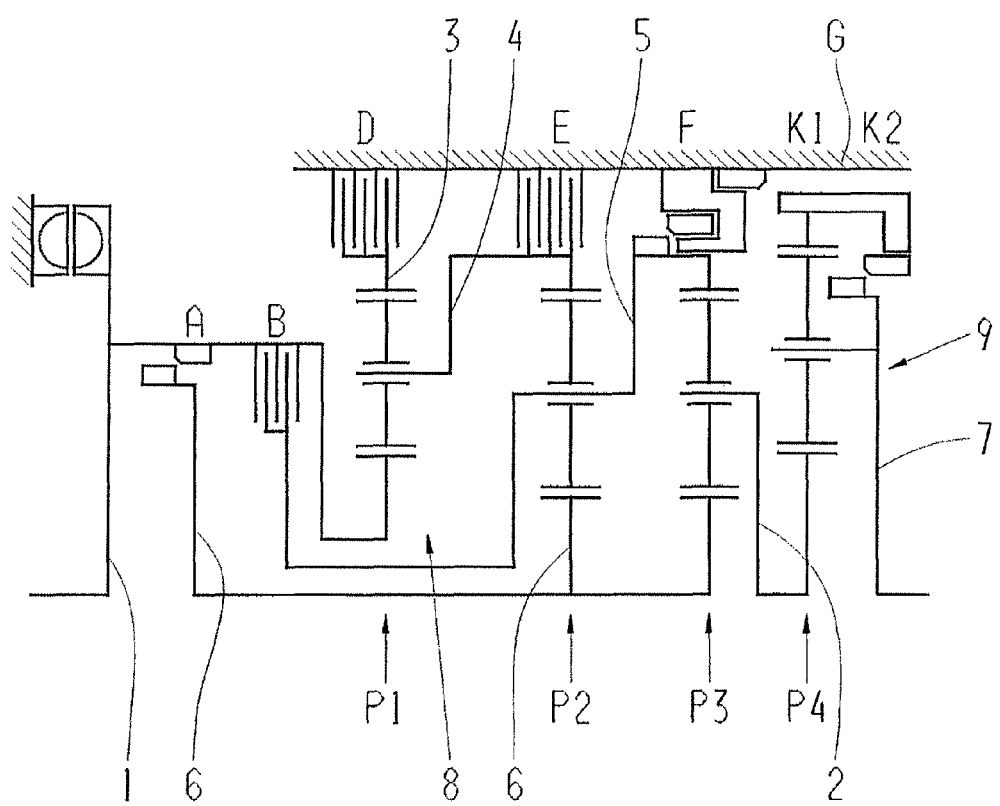
FIG. 4: a schematic view of a further preferred embodiment of a multistage transmission according to the invention, comprising a group transmission that is not shiftable under load.
Figure 4A:
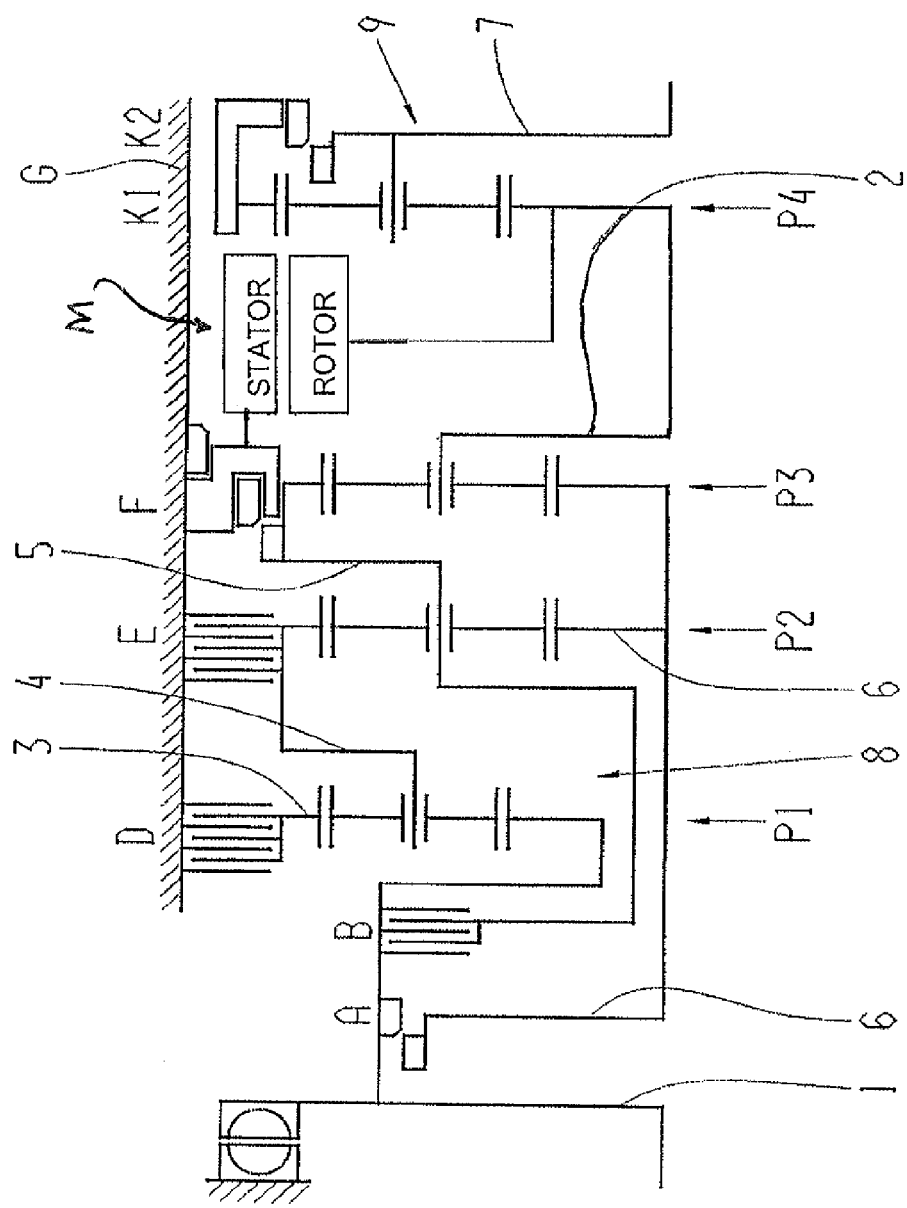
FIG. 4A: a schematic view of another embodiment of a multistage transmission, according to the invention, with an electric machine connected thereto.
Figure 4B:
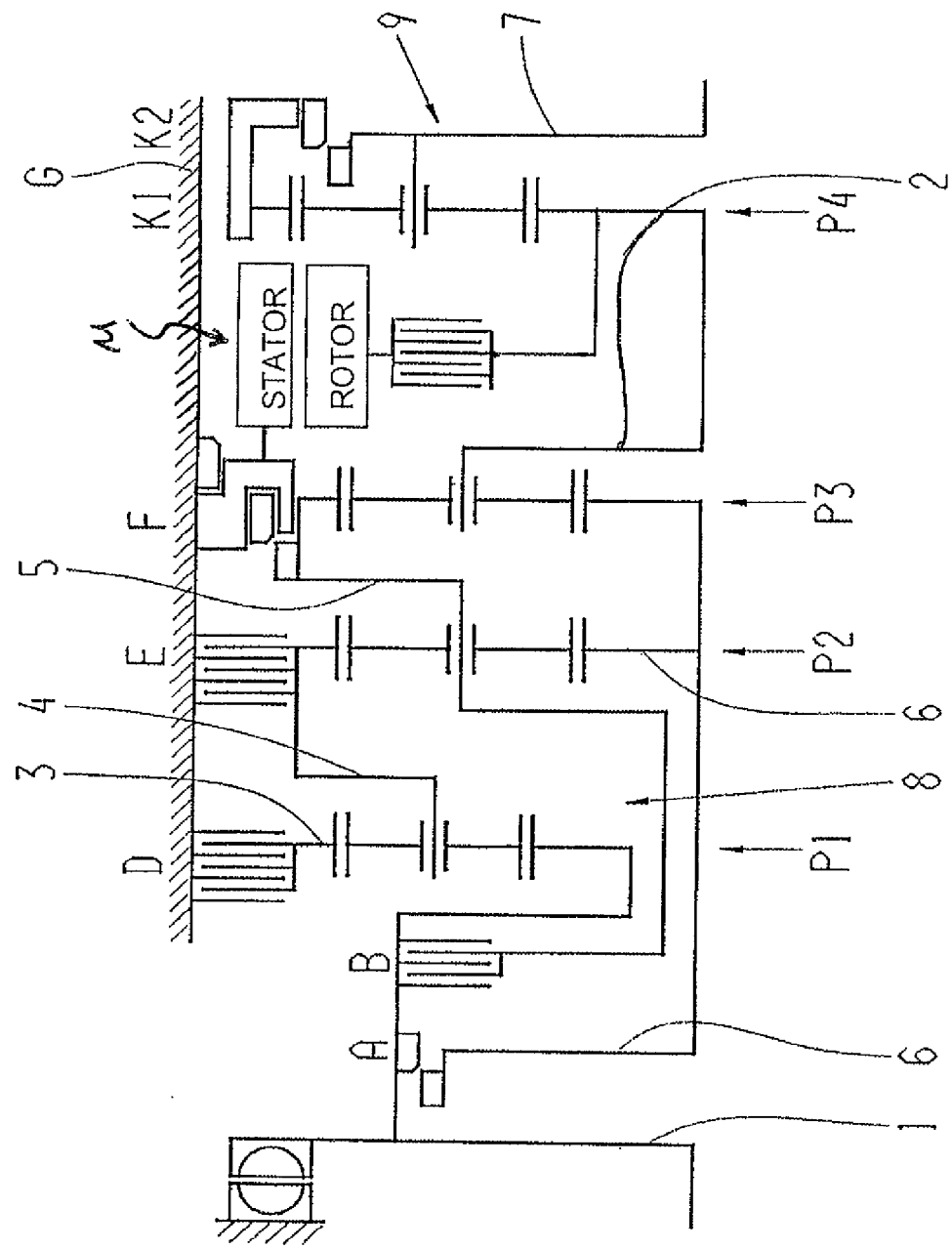
FIG. 4B: a schematic view of the another embodiment of a multistage transmission, according to the invention, with an electric machine connected thereto via a clutch.
Figure 4C:
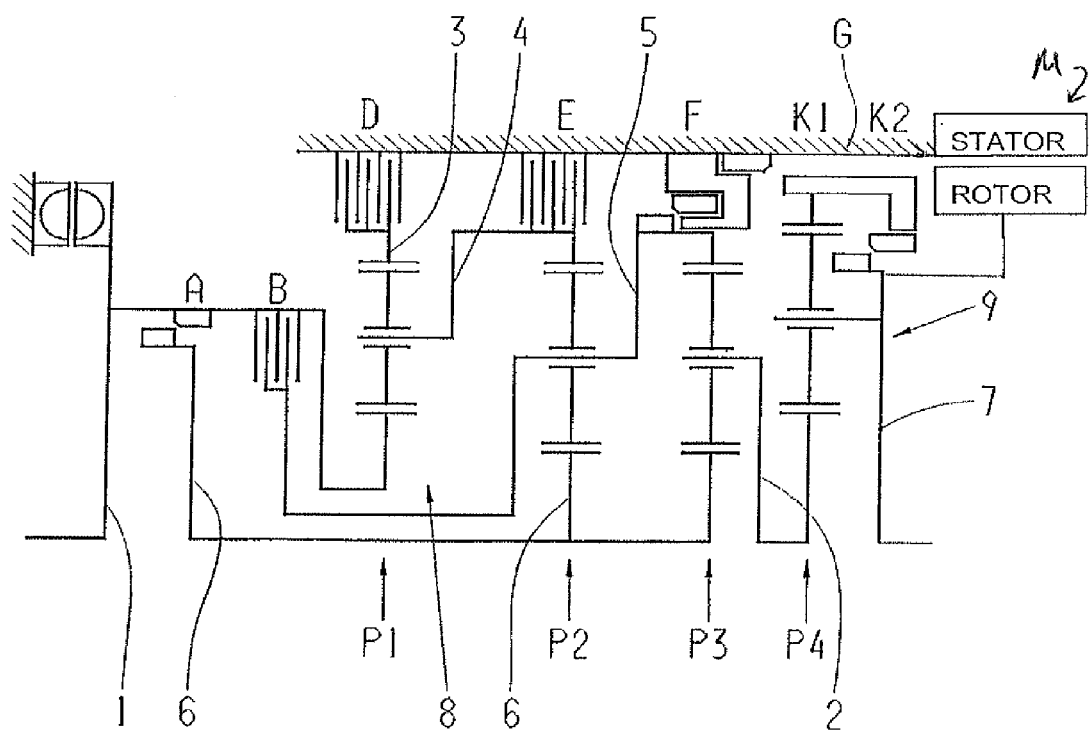
FIG. 4C: a schematic view of a further embodiment of a multistage transmission, according to the invention, with an electric machine connected thereto.
Figure 4D:
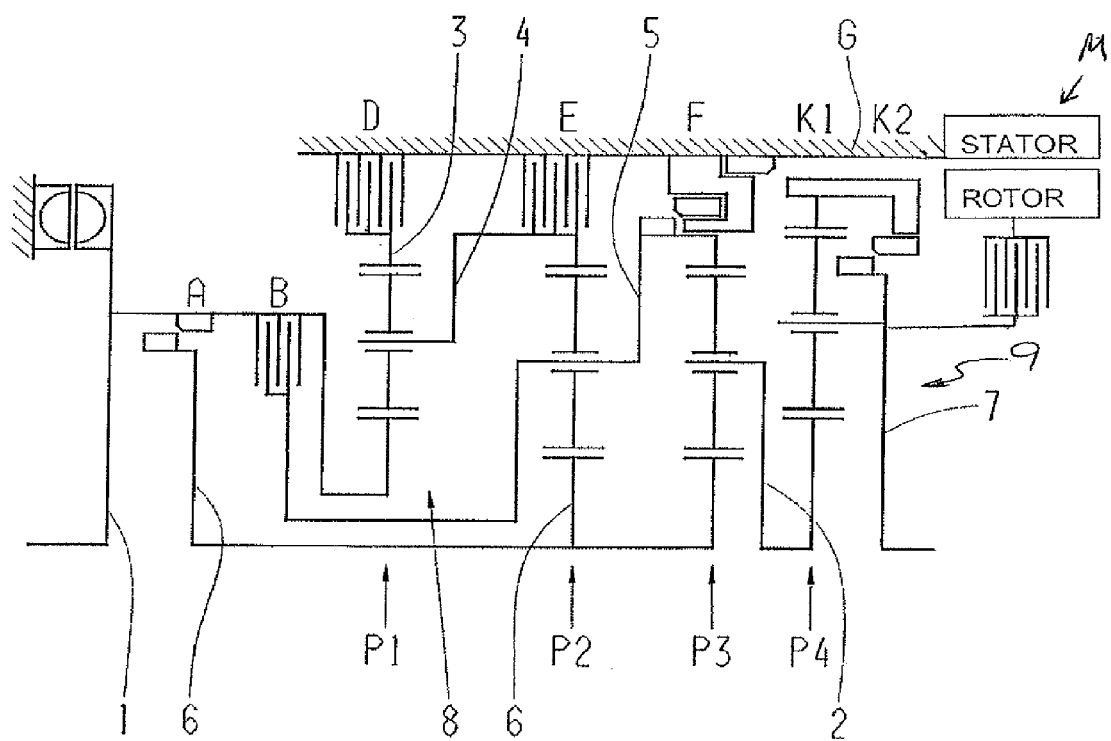
FIG. 4D: a schematic view of the further embodiment of a multistage transmission, according to the invention, with an electric machine connected thereto via a clutch.

The multistage transmission represented in FIG. 4 differs from the transmission according to FIG. 1 in that the second shift element K2 of the group transmission 9 is also implemented as a claw element. This leads to the fact that the group transmission 9 cannot be shifted under load, and also to a reduction in costs due to the elimination of a multi-disk element compared to the transmission according to FIG. 1. The interruption of tractive force can however be reduced to a minimum by synchronization of the second shift element K2 of the group transmission 9 by means of the shift elements of the basic transmission 8. Here, the second shift element K2 of the group transmission 9 is synchronized by two shift elements of the basic transmission implemented as multi-disk shift elements. Single track problems, such as overshoot, undershoot, tooth-on-tooth position, etc. are solved by a suitable control of these shift elements.

According to a further development of the invention, the third brake F of the basic transmission 8 implemented as a claw shift element, and the shift elements K1, K2 of the group transmission 9, implemented as claw shift elements, can be controlled by external actuation, for example pneumatically, This results in the advantage that the hydraulic control of the basic transmission 8 is not changed.

FIG. 5 shows an exemplary shift pattern for the forward gears of a multistage transmission according to FIG. 4, wherein with the example shown nine forward gears can be implemented. Two shift elements of the basic transmission 8 and one shift element of the group transmission 9 are engaged for each gear. It can be seen in FIG. 6 that when shifting sequentially, only one shift element in the basic transmission 8 must be engaged and one shift element must be disengaged in each case, because two adjacent gear steps jointly use two shift elements. Additionally, when shifting sequentially, only in the case of a gear change from the fourth into the fifth forward gear, or from the fifth into the fourth forward gear, a total of two shift elements are to be disengaged and two shift elements are to be engaged. It can be seen in the shift pattern according to FIG. 5 that a mechanical overall gear ratio spread of 14.77 can be attained, wherein the transmission ratio attainable in the group transmission 9 is 2.7.

The gear changes 1-2, 2-3, 3-4, 5-6, 6-7, 7-8, 8-9 and 9-8, 8-7, 7-6, 6-5, 4-3, 3-2, 2-1 can be shifted under load. With the gear changes 4-5 and 5-4, there is an interruption of tractive force in the scope of the group shift, which is on the order of magnitude of 0.5 seconds.

Because the first forward gear has a very high transmission ratio, it is required only in extreme situations; the forward gears 2-9 correspond to the gears of a harmonically stepped 8 speed transmission.

The first forward gear results from engaging the first clutch A and the third brake F of the basic transmission 8 and the first shift element K1 of the group transmission 9; a second forward gear results from engaging the first clutch A and the second brake E of the basic transmission 8 and the first shift element K1 of the group transmission 9; a third forward gear results from engaging the first clutch A and the first brake D of the basic transmission 8 and the first shift element K1 of the group transmission 9; a fourth forward gear results from engaging the first clutch A and the second clutch B of the basic transmission 8 and the first shift element K1 of the group transmission 9; a fifth forward gear results from engaging the first clutch A and the second brake E of the basic transmission 8 and the second shift element K2 of the group transmission 9; a sixth forward gear results from engaging the first clutch A and the first brake D of the basic transmission 8 and the second shift element K2 of the group transmission 9; the seventh forward gear, with the example shown designed as a direct gear, results from engaging the first clutch A and the second clutch B of the basic transmission 8 and a second shift element K2 of the group transmission 9; the eighth forward gear results from engaging the second clutch B and the first brake D of the basic transmission 8 and the second shift element K2 of the group transmission 9; and a ninth forward gear results from engaging the second clutch B and the second brake E of the basic transmission 8 and the second shift element K2 of the group transmission 9.

The subject matter of FIG. 6 is a shift pattern for a multistage transmission according to FIG. 5 with the difference that the first clutch A of the basic transmission 8 is implemented as a multi-disk shift element. With the example shown, eight forward gears can be implemented, wherein the gear changes 1-2, 2-3, 3-4, 4-5, 6-7, 7-8 and 8-7, 7-6, 5-4, 4-3, 3-2, 2-1 can be shifted under load. With the gear changes 5-6 and 6-5, there is an interruption of the tractive force in the scope of the group shift which is on the order of magnitude of 0.5 seconds. The mechanical overall gear ratio spread in the example shown is 10.39, wherein the transmission ratio attainable in the group transmission 9 is 1.9. Using the embodiment of the first clutch A of the basic transmission 8 as multi-disk shift element, all coasting downshifts out of the group shifting can be shifted under load.

The first forward gear results from engaging the first clutch A and the third brake F of the basic transmission 8 and the first shift element K1 of the group transmission 9; the second forward gear results from engaging the first clutch A and the second brake E of the basic transmission 8 and the first shift element K1 of the group transmission 9; a third forward gear results from engaging the first clutch A and the first brake D of the basic transmission 8 and the first shift element K1 of the group transmission 9; a fourth forward gear results from engaging the first clutch A and the second clutch B of the basic transmission 8 and the first shift element K1 of the group transmission 9; the fifth forward gear results from engaging the second clutch B and the first brake D of the basic transmission 8 and the first shift element K1 of the group transmission 9; a sixth forward gear designed with the example shown as a direct gear results from engaging the first clutch A and the second clutch B of the basic transmission 8 and the second shift element K2 of the group transmission 9; a seventh forward gear results from engaging the second clutch B and the first brake D of the basic transmission 8 and the second shift element K2 of the group transmission 9; and the eighth forward gear results from engaging the second clutch B and the second brake E of the basic transmission 8 and a second shift element K2 of the group transmission 9.

According to the invention, the multistage transmission, comprising a group transmission 8 that can or cannot be shifted under load, can be hybridized, whereby, in conjunction with the high overall gear ratio spread, a purely electric drive is possible by decoupling the drive via the basic transmission. Advantageously, the basic transmission remains unaffected.

Here, according to a first variant of the invention, an electric machine, or alternatively an hydraulic motor or pneumatic motor or a flywheel storage device, is attached to the group transmission in such a manner that the transmission ratio of the group transmission serves as a reduction of the electric machine, and thus is used for increasing the torque of the electric machine. Preferably, the rotor of the electric machine is connected, or can be releasably connected, to the sun gear of the planetary gear set of the group transmission. For the case of a claw group shift, the electric machine can serve in an advantageous manner for synchronizing the claw shift and significantly shortening this shift.

According to a further embodiment, an electric machine, or alternatively a hydraulic motor or pneumatic motor or a flywheel storage device, can be connected downstream of the group transmission, in the power flow direction, in the tractive mode, wherein the rotor of the electric machine is connected, or can be releasably connected, to the carrier of the planetary gear set of the group transmission. This embodiment results in the advantage that an interruption of the tractive force during a group shift can be compensated for, because the electric machine can be used for bridging the interruption of tractive force during the group shift.

According to the invention, it is also optionally possible to provide additional freewheels at each suitable location of the multistage transmission, for example, between a shaft and the housing, or possibly to connect two shafts.

An axle differential and/or a distributor differential can be disposed on the drive side or on the output side.

The multistage transmission, according to the invention, also makes it possible to situate a torsional-vibration damper between the drive engine and the transmission.

Within the scope of a further, not depicted embodiment of the invention, a wear-free brake, for instance, a hydraulic or electric retarder or the like, can be disposed on each shaft, preferably on the drive shaft 1 or the output shaft 7, which is of special significance for use in commercial vehicles in particular. Furthermore, a power take-off drive can be provided on each shaft, preferably on the drive shaft 1 or the output shaft 7, for driving additional assemblies.

A further advantage of the multistage transmission presented here is that an electric machine can be attached to each shaft as a generator and/or as an additional drive machine in FIGS. 1A, 1B, 1C, 1D, 4A, 4B, 4C and 4D. In those Figures, an electric machine M is attached to the group transmission 9 so that the transmission ratio of the group transmission 9 serves as a reduction of the electric machine M, and thus is used for increasing torque of the electric machine M. The rotor of the electric machine M is directly connected (FIGS. 1A and 4A), or can be releasably connected (FIGS. 1B and 4B), via a clutch for example, to the sun of the planetary gear set P4 or the rotor of the electric machine M is directly connected (FIGS. 1C and 4C), or can be releasably connected (FIGS. 1D, and 4D), via a clutch for example, to the carrier of the planetary gear set P4.

| Reference Characters | |
|---|---|
| 1 | first shaft, drive shaft |
| 2 | second shaft, output shaft of the basic transmission 8 |
| 3 | third shaft |
| 4 | fourth shaft |
| 5 | fifth shaft |
| 6 | sixth shaft |
| 7 | output shaft 7 of the multistage transmission |
| 8 | basic transmission |
| 9 | group transmission |
| A | first clutch |
| B | second clutch |
| D | first brake |
| E | second brake |
| F | third brake |
| G | housing |
| K1 | first shift element of the group transmission 9 |
| K2 | second shift element of the group transmission 9 |
| P1 | first planetary gear set |
| P2 | second planetary gear set |
| P3 | third planetary gear set |
| P4 | fourth planetary gear set |

The invention claimed is:

1. A multi-stage automatic transmission of a planetary design for a motor vehicle, the multi-stage transmission comprising:
   a basic transmission (8) and a group transmission (9) located downstream of the basic transmission (8);
   the basic transmission (8) comprising:
      first, second and third planetary gear sets (P1, P2, P3) and each of the first planetary gear set (P1), the second planetary gear set (P2) and the third planetary gear set (P3) comprising a sun gear, a ring gear and a carrier;
      at least a drive shaft (1), an output shaft (2) and third, fourth, fifth and sixth rotatable shafts (3, 4, 5, 6);
      at least five shift elements (A, B, D, E, F) whose selective engagement implementing different transmission ratios between the drive shaft and the output shaft; and
   the group transmission (9) comprising:
      a minus planetary gear set (P4) having a sun gear, a ring gear and a carrier, the sun gear of the minus planetary gear set (P4) being continuously connected to the output shaft (2) of the basic transmission (8),
      the ring gear of the minus planetary gear set (P4) being connectable, via a first shift component (K1), to a housing (G),
      the carrier of the minus planetary gear set (P4) being continuously connected to a drive output shaft (7) of the multi-stage transmission, and
      the ring gear of the minus planetary gear set (P4) being connectable, via a second shift component (K2), to the drive output shaft (7), and
   the housing (G) housing both the basic transmission (8) and the group transmission (9) within a common housing.

2. The multi-stage transmission according to claim 1, wherein the basic transmission (8) is implemented such that
   the drive shaft (1) is continuously connected to the sun gear of the first planetary gear set (P1) and the drive shaft (1) is connectable, via a first clutch (A), to the sixth shaft (6), and the drive shaft (1) is connectable, via a second clutch (B), to the fifth shaft (5);
   the output shaft (2) of the basic transmission (8) is continuously connected to the carrier of the third planetary gear set (P3);
   the third shaft (3) is continuously connected to the ring gear of the first planetary gear set (P1) and is connectable, via a first brake (D) to the housing (G);
   the fourth shaft (4) is continuously connected to the carrier of the first planetary gear set (P1) and the ring gear of the second planetary gear set (P2), and the fourth shaft (4) is connectable, via a second brake (E), to the housing (G);
   the fifth shaft (5) is continuously connected to the carrier of the second planetary gear set (P2) and to the ring gear of the third planetary gear set (P3), and the fifth shaft (5) is connectable, via a third brake (F), to the housing (G);
   the sixth shaft (6) is continuously connected to the sun gear of the second planetary gear set (P2) and the sun gear of the third planetary gear set (P3); and
   the first clutch (A), of the basic transmission (8), is implemented as one of a form-locking shift element and a multi-disk shift element, and the second clutch (B), the first brake (D) and the second brake (E) of the basic transmission (8) are implemented as multi-disk shift elements.

3. The multi-stage transmission according to claim 2, wherein the second shift component (K2), of the group transmission (9), releasably connects the drive output shaft (7) of the multi-stage transmission to the ring gear of the minus planetary gear set (P4) of the group transmission (9), and the second shift component (K2) is a multi-disk shift element for ensuring that the group transmission (9) is shiftable under load, and the first shift component (K1) of the group transmission (9) is one of a multi-disk shift element and a form-locking shift element.

4. The multi-stage transmission according to claim 3, wherein the multi-stage transmission can implement nine forward gears,
   a first forward gear is implemented by engagement of the first clutch (A) and the third brake (F) of the basic transmission (8) and the first shift component (K1) of the group transmission (9);
   a second forward gear is implemented by engagement of the first clutch (A) and the second brake (E) of the basic transmission (8) and the first shift component (K1) of the group transmission (9);
   a third forward gear is implemented by engagement of the first clutch (A) and the first brake (D) of the basic transmission (8) and the first shift component (K1) of the group transmission (9);

a fourth forward gear is implemented by engagement of the first clutch (A) and the second clutch (B) of the basic transmission (8) and the first shift component (K1) of the group transmission (9);

a fifth forward gear is implemented by engagement of the first clutch (A) and the second brake (E) of the basic transmission (8) and the second shift component (K2) of the group transmission (9);

a sixth forward gear is implemented by engagement of the first clutch (A) and the first brake (D) of the basic transmission (8) and the second shift component (K2) of the group transmission (9);

a seventh forward gear is implemented by engagement of the first clutch (A) and the second clutch (B) of the basic transmission (8) and the second shift component (K2) of the group transmission (9);

an eighth forward gear is implemented by engagement of the second clutch (B) and the first brake (D) of the basic transmission (8) and the second shift component (K2) of the group transmission (9);

a ninth forward gear is implemented by engagement of the second clutch (B) and the second brake (E) of the basic transmission (8) and the second shift component (K2) of the group transmission (9), and upward and downward gear changes, between the first and the second forward gears, the second and the third forward gears, the third and the fourth forward gears, the fourth and the fifth forward gears, the fifth and the six forward gears, the sixth and the seventh forward gears, the seventh and the eighth forward gears, and the eighth and the ninth forward gears are shiftable under load.

5. The multi-stage transmission according to claim 3, wherein the multi-stage transmission can implement eight forward gears, a first forward gear is implemented by engagement of the first clutch (A) and the third brake (F) of the basic transmission (8) and the first shift component (K1) of the group transmission (9);

a second forward gear is implemented by engagement of the first clutch (A) and the second brake (E) of the basic transmission (8) and the first shift component (K1) of the group transmission (9);

a third forward gear is implemented by engagement of the first clutch (A) and the first brake (D) of the basic transmission (8) and the first shift component (K1) of the group transmission (9);

a fourth forward gear is implemented by engagement of the first clutch (A) and the second clutch (B) of the basic transmission (8) and the first shift component (K1) of the group transmission (9);

a fifth forward gear is implemented by engagement of the second clutch (B) and the first brake (D) of the basic transmission (8) and the first shift component (K1) of the group transmission (9);

a sixth forward gear is implemented by engagement of the first clutch (A) and the second clutch (B) of the basic transmission (8) and the second shift component (K2) of the group transmission (9);

a seventh forward gear is implemented by engagement of the second clutch (B) and the first brake (D) of the basic transmission (8) and the second shift component (K2) of the group transmission (9);

an eighth forward gear is implemented by engagement of the second clutch (B) and the second brake (E) of the basic transmission (8) and the second shift component (K2) of the group transmission (9), and upward and downward gear changes between the first and the second forward gears, the second and the third forward gears, the third and the fourth forward gears, the fourth and the fifth forward gears, the fifth and the six forward gears, the sixth and the seventh forward gears, and the seventh and the eighth forward gears are shiftable under load.

6. The multi-stage transmission according to claim 2, wherein the third brake (F) of the basic transmission (8) is implemented as a form-locking shift element, and control thereof, in implementation as a multi-disc shift element, is used for controlling the second shift element (K2) of the group transmission (9).

7. The multi-stage transmission according to claim 2, wherein the second shift component (K2) of the group transmission (9) releasably connects the drive output shaft (7) of the multi-stage transmission to the ring gear of the minus planetary gear set (P4) of the group transmission (9) and is designed as a form-locking shift element, and the first shift component (K1) of the group transmission (9) is one of a multi-disk shift element and a form-locking shift element.

8. The multi-stage transmission according to claim 7, wherein the third brake (F) of the basic transmission (8) is a form-locking shift element.

9. The multi-stage transmission according to claim 7, wherein the multi-stage transmission can implement nine forward gears, a first forward gear is implemented by engagement of the first clutch (A) and the third brake (F) of the basic transmission (8) and the first shift component (K1) of the group transmission (9);

a second forward gear is implemented by engagement of the first clutch (A) and the second brake (E) of the basic transmission (8) and the first shift component (K1) of the group transmission (9);

a third forward gear is implemented by engagement of the first clutch (A) and the first brake (D) of the basic transmission (8) and the first shift component (K1) of the group transmission (9);

a fourth forward gear is implemented by engagement of the first clutch (A) and the second clutch (B) of the basic transmission (8) and the first shift component (K1) of the group transmission (9);

a fifth forward gear is implemented by engagement of the first clutch (A) and the second brake (E) of the basic transmission (8) and the second shift component (K2) of the group transmission (9);

a sixth forward gear is implemented by engagement of the first clutch (A) and the first brake (D) of the basic transmission (8) and the second shift component (K2) of the group transmission (9);

a seventh forward gear is implemented by engagement of the first clutch (A) and the second clutch (B) of the basic transmission (8) and the second shift component (K2) of the group transmission (9);

an eighth forward gear is implemented by engagement of the second clutch (B) and the first brake (D) of the basic transmission (8) and the second shift component (K2) of the group transmission (9);

a ninth forward gear is implemented by engagement of the second clutch (B) and the second brake (E) of the basic transmission (8) and the second shift component (K2) of the group transmission (9), and upward and downward gear changes between the first and the second forward gears, the second and the third forward gears, the third and the fourth forward gears, the fifth and the six forward gears, the sixth and the seventh forward gears, the seventh and the eighth forward gears, and the eighth and the ninth forward gears are shiftable under load, and two of the shift elements of the basic transmission (8) that are implemented as multi-disk shift elements of the basic transmission (8) synchronize the second shift component (K2) of the group transmission (9) to reduce interruption of the tractive force.

10. The multi-stage transmission according to claim 7, wherein the multi-stage transmission can implement eight forward gears,
- a first forward gear is implemented by engagement of the first clutch (A) and the third brake (F) of the basic transmission (8) and the first shift component (K1) of the group transmission (9);
- a second forward gear is implemented by engagement of the first clutch (A) and the second brake (E) of the basic transmission (8) and the first shift component (K1) of the group transmission (9);
- a third forward gear is implemented by engagement of the first clutch (A) and the first brake (D) of the basic transmission (8) and the first shift component (K1) of the group transmission (9);
- a fourth forward gear is implemented by engagement of the first clutch (A) and the second clutch (B) of the basic transmission (8) and the first shift component (K1) of the group transmission (9);
- a fifth forward gear is implemented by engagement of the second clutch (B) and the first brake (D) of the basic transmission (8) and the first shift component (K1) of the group transmission (9);
- a sixth forward gear is implemented by engagement of the first clutch (A) and the second clutch (B) of the basic transmission (8) and the second shift component (K2) of the group transmission (9);
- a seventh forward gear is implemented by engagement of the second clutch (B) and the first brake (D) of the basic transmission (8) and the second shift component (K2) of the group transmission (9);
- an eighth forward gear is implemented by engagement of the second clutch (B) and the second brake (E) of the basic transmission (8) and the second shift component (K2) of the group transmission (9), and
- upward and downward gear changes between the first and the second forward gears, the second and the third forward gears, the third and the fourth forward gears, the fourth and the fifth forward gears, the sixth and the seventh forward gears, and the seventh and the eighth forward gears are shiftable under load.

11. The multi-stage transmission according to claim 1, wherein an electric machine is attached to the group transmission (9) such that the transmission ratio of the group transmission (9) serves as a reduction of the electric machine to increase torque of the electric machine.

12. The multi-stage transmission according to claim 11, wherein the electric machine is either connected or releasably connected to the sun gear of the minus planetary gear set (P4) of the group transmission (9).

13. The multi-stage transmission according to claim 1, wherein an electric machine is connected, in a tractive mode, downstream of the group transmission (9), in a direction of power flow, and a rotor of the electric machine is either connected or releasably connected to the carrier of the minus planetary gear set (P4) of the group transmission (9).

14. The multi-stage transmission according to claim 1, wherein the third brake (F) of the basic transmission (8) that is a form-locking shift element and the first and the second shift components (K1, K2) of the group transmission (9) that are form-locking shift elements are controlled via an external control.

15. The multi-stage transmission according to claim 1, wherein the first, the second, and the third planetary gear sets (P1, P2, P3) are minus planetary gear sets and are axially, sequentially arranged in an order of the first planetary gear set (P1), the second planetary gear set (P2) and the third planetary gear set (P3).

\* \* \* \* \*